United States Patent
Oishi et al.

(10) Patent No.: US 12,022,355 B2
(45) Date of Patent: Jun. 25, 2024

(54) CONTROL DEVICE AND STORAGE MEDIUM

(71) Applicant: KABUSHIKI KAISHA TOKAI RIKA DENKI SEISAKUSHO, Aichi (JP)

(72) Inventors: Yoshiki Oishi, Aichi (JP); Kenichi Koga, Aichi (JP); Tatsuya Koike, Aichi (JP); Satoshi Mori, Aichi (JP); Kento Kataoka, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 264 days.

(21) Appl. No.: 17/545,432

(22) Filed: Dec. 8, 2021

(65) Prior Publication Data

US 2022/0248173 A1   Aug. 4, 2022

(30) Foreign Application Priority Data

Jan. 29, 2021   (JP) .................................. 2021-013011

(51) Int. Cl.
*H04W 4/02*   (2018.01)

(52) U.S. Cl.
CPC ........... *H04W 4/023* (2013.01); *H04W 4/027* (2013.01)

(58) Field of Classification Search
CPC ... G07C 2209/63; G07C 9/00309; G01S 5/06; G01S 5/14; H04B 2201/71634; H04L 25/0212; H04L 25/03292; H04W 4/48; H04W 4/029; H04W 28/0215; H04W 4/027; H04W 4/023
See application file for complete search history.

(56) References Cited

U.S. PATENT DOCUMENTS

| | | | |
|---|---|---|---|
| 2019/0338562 A1 | 11/2019 | Koya et al. | |
| 2020/0017074 A1 | 1/2020 | Nakajima et al. | |
| 2020/0049836 A1* | 2/2020 | Taber | G01S 5/02216 |
| 2021/0027130 A1* | 1/2021 | Ette | G07C 9/00182 |
| 2021/0211327 A1* | 7/2021 | Tertinek | H04B 1/71637 |
| 2023/0060556 A1* | 3/2023 | Oishi | G01S 5/0278 |
| 2023/0065313 A1* | 3/2023 | Oishi | G01S 3/10 |
| 2023/0067707 A1* | 3/2023 | Oishi | G01S 3/043 |

FOREIGN PATENT DOCUMENTS

| | | | | |
|---|---|---|---|---|
| DE | 102022116690 A1 * | 3/2023 | ......... | G01S 13/765 |
| JP | 6135031 | 5/2017 | | |
| JP | 2018-154967 | 10/2018 | | |

(Continued)

*Primary Examiner* — Matthew C Sams
(74) *Attorney, Agent, or Firm* — GREENBLUM & BERNSTEIN, P.L.C.

(57) ABSTRACT

To provide a novel and improved control device and storage medium capable of performing control based on a positional relation with higher accuracy.

A control device includes a control unit configured to perform control based on a presence area of a second communication device estimated using signals transmitted and received between a first communication device and the second communication device. The control unit performs control based on a presence area estimated most often among a plurality of presence areas estimated from signals transmitted and received a plurality of times during a certain time length.

12 Claims, 5 Drawing Sheets

(56) References Cited

FOREIGN PATENT DOCUMENTS

| | | | | |
|---|---|---|---|---|
| JP | 2018-179952 | 11/2018 | | |
| JP | 2020-008575 | 1/2020 | | |
| JP | 2023036221 A | * 3/2023 | ........... | G01S 13/765 |
| JP | 2023036222 A | * 3/2023 | ........... | G01S 5/0278 |
| JP | 2023036223 A | * 3/2023 | ........... | G01S 5/0226 |
| WO | 2015/176776 | 11/2015 | | |

* cited by examiner

| No. | TIME | RECEPTION POWER | POSITION CHANGE | ESTIMATED POSITION | DETERMINATION RESULT |
|---|---|---|---|---|---|
| 1 | t1 | -70dBm | SMALL | (x1, y1, z1) | D ENTRY |
| 2 | t2 | -80dBm | SMALL | (x2, y2, z2) | P ENTRY |
| 3 | t3 | -90dBm | SMALL | (x3, y3, z3) | D ENTRY |
| 4 | t4 | -90dBm | LARGE | (x4, y4, z4) | D ENTRY |
| 5 | t5 | -70dBm | LARGE | (x5, y5, z5) | BD ENTRY |
| 6 | t6 | -70dBm | LARGE | (x6, y6, z6) | P ENTRY |

CONTROL DEVICE AND STORAGE MEDIUM

CROSS REFERENCE TO RELATED APPLICATION(S)

This application is based upon and claims benefit of priority from Japanese Patent Application No. 2021-013011, filed on Jan. 29, 2021, the entire contents of which are incorporated herein by reference.

BACKGROUND

The present invention relates to a control device and a storage medium.

In recent years, technologies for causing one device to estimate positions of other devices in accordance with results obtained by transmitting and receiving signals between the devices have been developed. For example, PCT International Publication No. WO 2015/176776 discloses a technology for causing an ultra-wideband (UWB) receiver to estimate a positional relation in a UWB transmitter using a UWB signal.

SUMMARY

In the foregoing system, there is a possibility of an estimation result of the positional relation being affected by a multi-path environment.

Accordingly, the present invention has been devised in view of the foregoing problem and an objective of the present invention is to provide a novel and improved control device and storage medium capable of performing control based on a positional relation with higher accuracy.

To solve the foregoing problem, according to an aspect of the present invention, there is provided a control device including a control unit configured to perform control based on a presence area of a second communication device estimated using signals transmitted and received between a first communication device and the second communication device. The control unit performs control based on a presence area estimated most often among a plurality of presence areas estimated from signals transmitted and received a plurality of times during a certain time length.

To solve the foregoing problem, according to another aspect of the present invention, there is provided a computer-readable non-transitory storage medium that stores a program causing a computer to implement a control function of performing control based on a presence area of a first or second communication device estimated using signals transmitted and received between the first and second communication devices. Control is performed based on a presence area estimated most often among a plurality of presence areas estimated from signals transmitted and received a plurality of times during a certain time length.

According to the above-described aspects of the present invention, it is possible to perform control based on a positional relation with higher accuracy.

DETAILED DESCRIPTION OF THE EMBODIMENTS

Figure 1:
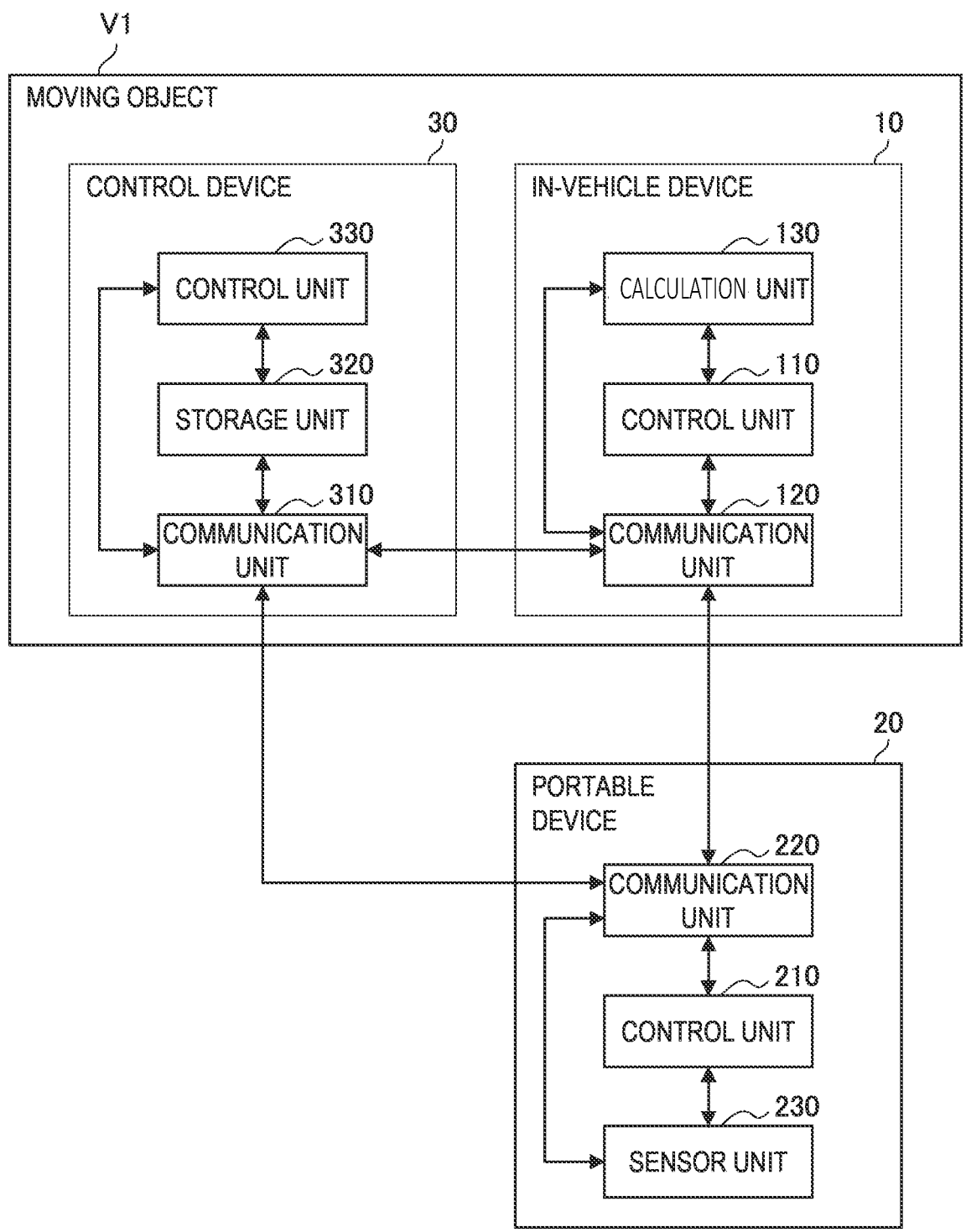
FIG. 1 is a block diagram illustrating an exemplary configuration of a system 1 according to an embodiment.

Hereinafter, preferred embodiments of the present invention will be described in detail with reference to the following appended drawings. In the present specification and the drawings, the same reference numerals are given to constituent elements that have substantially the same functional configurations, and description thereof will be omitted.

1. Embodiment 1.1 Exemplary System Configuration

First, an overall configuration of a system 1 according to an embodiment will be described with reference to FIG. 1. FIG. 1 is a block diagram illustrating an exemplary configuration of the system 1 according to an embodiment.

As illustrated in FIG. 1, the system 1 according to the embodiment includes a moving object V1 and a portable device 20. The moving object V1 includes an in-vehicle device 10 and a control device 30.

The moving object V1 according to the embodiment may be, for example, a vehicle which a user is permitted to board (for example, a vehicle owned by the user or a vehicle lent temporarily to the user) or may be an airplane, a ship, or the like. In the following description, the moving object V1 is assumed to be a vehicle as a main example.

In-Vehicle Device 10

The in-vehicle device 10 according to the embodiment is an example of a first communication device according to the present invention. The in-vehicle device 10 according to the embodiment may be, for example, a communication unit mounted in a vehicle which the user is permitted to board.

As illustrated in FIG. 1, the in-vehicle device 10 according to the embodiment includes a control unit 110, a communication unit 120, and a calculation unit 130.

The control unit 110 controls a general operation in the in-vehicle device 10. For example, the control unit 110 controls transmission and reception of wireless signals in conformity with a specific communication standard through an antenna. The specific communication standard includes, for example, an ultra-wideband signal (hereinafter referred to as a UWB signal).

Functions of the control unit 110 according to the embodiment are implemented by, for example, various processors.

The communication unit 120 transmits and receives wireless signals in conformity with a specific communication standard through an antenna under the control of the control unit 110.

For example, the communication unit 120 receives a Poll (polling) signal from a communication unit 220 included in the portable device 20. The communication unit 120 transmits a Resp (response) signal as a reply to the Poll signal to the communication unit 220 included in the portable device 20. The communication unit 120 receives a Final signal transmitted from the communication unit 220 as a reply to the Resp signal.

The calculation unit 130 calculates a reliability parameter indicating how appropriate signals transmitted and received by any antenna of the communication unit 120 are as signals used to estimate a presence area to be described below. The details of the reliability parameter will be described below.

The calculation unit 130 performs a calculation operation of estimating a positional relation between the in-vehicle device 10 and the portable device 20 based on signals transmitted and received between the in-vehicle device 10 and the portable device 20. For example, the calculation unit 130 may perform a calculation operation of estimating an arrival angle of the signal based on a received signal. The calculation unit 130 may perform a calculation operation of estimating a distance between the in-vehicle device 10 and the portable device 20 based on transmitted and received signals. The calculation unit 130 may perform a calculation operation of estimating a 3-dimensional position of the portable device 20 based on an estimated arrival angle of a signal and a distance between the in-vehicle device 10 and the portable device 20.

The calculation unit 130 may determine a presence area of the portable device 20 based on the 3-dimensional position of the portable device 20. A specific example of the presence area will be described below.

Portable Device 20

The portable device 20 according to the embodiment is an example of a second communication device according to the present invention. The portable device 20 may be, for example, a smartphone, an electronic key, or a wearable terminal. The portable device 20 according to the embodiment is carried by, for example, a user and performs transmission and reception of wireless communication in conformity with specific communication with the in-vehicle device 10 mounted in a moving object V1 such as a vehicle used by the user.

As illustrated in FIG. 1, the portable device 20 according to the embodiment includes a control unit 210, the communication unit 220, and a sensor unit 230.

The control unit 210 controls a general operation in the portable device 20. For example, the control unit 210 controls transmission and reception of wireless signals in conformity with a specific communication standard.

Functions of the control unit 210 according to the embodiment are implemented by, for example, various processors.

The communication unit 220 transmits and receives wireless signals in conformity with a specific communication standard through an antenna under the control of the control unit 210.

The communication unit 220 transmits, for example, a Poll signal to the communication unit 120 included in the in-vehicle device 10. The communication unit 220 receives a Resp signal transmitted from the communication unit 120 as a reply to the Poll signal. The communication unit 220 transmits a Final signal as a reply to the Resp signal to the communication unit 120.

The communication unit 220 may transmit various kinds of information acquired by the sensor unit 230 to be described below to the communication unit 310 included in the control device 30. The various kinds of information acquired by the sensor unit 230 may be directly transmitted from the portable device 20 to the control device 30 or may be transmitted from the in-vehicle device 10 to the control device 30 via the in-vehicle device 10.

The sensor unit 230 detects a position change based on a movement of the portable device 20. For example, a function of the sensor unit 230 is realized by an acceleration sensor, a gyro sensor, an image sensor, a global navigation satellite system (GNSS), or the like.

The portable device 20 may have a configuration that has a function of the calculation unit 130 included in the in-vehicle device 10. In this case, various calculation operations performed by the calculation unit 130 may be performed by the portable device 20.

Control Device 30

The control device 30 according to the embodiment is an example of a control device according to the present invention and performs control based on a presence area of the portable device 20 estimated using signals transmitted and received between the in-vehicle device 10 and the portable device 20 on a controlled device mounted in the moving object V1.

Hereinafter, an exemplary configuration of the control device 30 according to the embodiment will be described.

1.2 Exemplary Configuration of Control Device 20 According to Embodiment

As illustrated in FIG. 1, the control device 30 includes, for example, a communication unit 310, a storage unit 320, and a control unit 330.

The communication unit 310 receives various calculation results calculated by the calculation unit 130 included in the in-vehicle device 10. The communication unit 310 may directly receive various calculation results from the communication unit 120 included in the in-vehicle device 10 or may receive various calculation results from the communication unit 220 included in the portable device 20 via the portable device 20.

The communication unit 310 may receive information regarding a movement of the portable device 20 detected by the sensor unit 230 from the communication unit 220 included in the portable device 20.

The storage unit 320 retains various calculation results received by the communication unit 310. For example, the storage unit 320 separately retains each calculation result calculated based on signals transmitted and received a plurality of times during a certain time length for each time. Information regarding a movement of the portable device 20 detected by the sensor unit 230 may be retained in association with a time of the calculation result.

The control unit 330 performs control based on a presence area estimated most often among estimation results of a plurality of presence areas estimated from the signals transmitted and received a plurality of times for a certain time length. Here, there are various methods of determining a presence area estimated most often. The details of the methods will be described below.

The exemplary configuration of the system 1 according to the embodiment has been described above. Next, technical features according to the embodiment will be described with reference to FIGS. 2 to 6.

2. Technical Features 2.1. Multi Path Environment

In a process based on signals transmitted and received between the in-vehicle device 10 and the portable device 20, there is a possibility of estimation accuracy of the positional relation deteriorating depending on a radio wave propagation environment.

As an example of such a situation, a case in which an object such as a pillar is within a communication path from the communication unit 120 to the communication unit 220 can be exemplified. In this case, for example, there is a possibility of reception power of transmitted and received signals being reduced. Accordingly, the estimation accuracy of the positional relation can deteriorate.

As another example of such a situation, a case in which multi paths occur can be exemplified. Multi paths indicate a state in which radio waves transmitted from a certain transmitter (for example, the portable device 20) arrive at a receiver (for example, the in-vehicle device 10) a plurality of times, and occur when there are a plurality of paths of radio waves between the transmitter and the receiver. In a situation in which the multi paths occur, there is a possibility of the estimation accuracy of the positional relation deteriorating due to mutual interference of radio waves passing through a plurality of different paths.

Accordingly, the calculation unit 130 is likely to be able to estimate a presence area of the portable device 20, including an influence of an estimation error of a positional relation caused by a multi path environment. Here, the control device 30 according to the embodiment performs control based on the presence area estimated most often among the estimation results of the plurality of presence areas estimated from the signals transmitted and received the plurality of times for the certain time length. Thus, it is possible to reduce the above-described influence of the estimation error of the positional relation caused by the multi path environment.

Hereinafter, an overview example of the system 1 according to the embodiment will be described with reference to FIG. 2.

Figure 2:
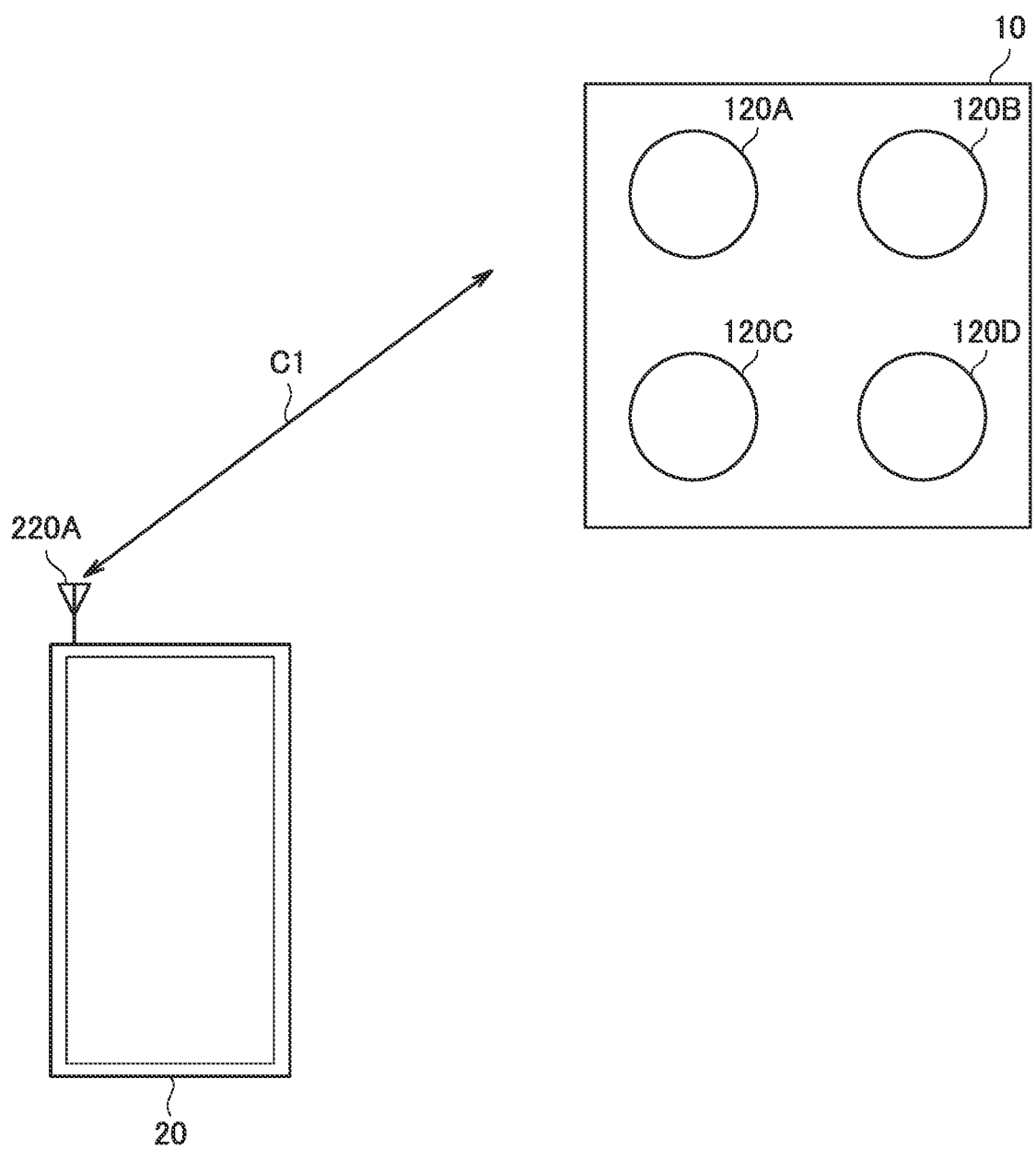
FIG. 2 is a diagram illustrating an exemplary overview of the system according to the embodiment.

FIG. 2 is a diagram illustrating an exemplary overview of the system 1 according to the embodiment. As illustrated in FIG. 2, the communication unit 120 of the in-vehicle device 10 includes, for example, antennas 120A, 120B, 120C, and 120D as a four-elements array antenna. The portable device 20 includes an antenna 220A as the communication unit 220. Here, the number of antennas included in the communication unit 120 of the in-vehicle device 10 and the communication unit 220 of the portable device 20 is not limited to this example. The number of antennas included in the communication unit 120 and the communication unit 220 may be singular or plural.

A scale ratio of the plurality of antennas included in the communication unit 120 and the in-vehicle device 10 is not limited to an illustrated scale ratio either. For example, the antennas 120A, 120B, 120C, and 120D may be disposed at an interval of ½ of a wavelength. A disposition shape of the four antennas may be a square, a parallelogram, a trapezoid, a rectangle, or any shape.

In FIG. 2, the antenna 220A included in the portable device 20 is disposed at the top left end of the portable device 20, but a disposition position of the antenna 220A included in the portable device 20 is not limited to this example. For example, the antenna 220A may be disposed at any position of the portable device 20.

As illustrated in FIG. 2, for example, the antenna 220A may transmit and receive a signal C1 to and from at least one of the plurality of antennas included in the communication unit 120.

The calculation unit 130 may estimate a positional relation between the in-vehicle device 10 and the portable device 20 based on the transmitted and received signal C1.

2.2. CIR Calculation Process

The communication unit 120 included in the in-vehicle device 10 and the communication unit 220 included in the portable device 20 according to the embodiment can calculate a channel impulse response (CIR) indicating a property of a wireless communication path between the communication units 120 and 220.

In the present specification, the CIR is calculated when one (hereinafter also referred to as a transmission side) of the communication units 120 and 220 transmits a wireless signal including a pulse and the other (hereinafter also referred to as a reception side) receives the wireless signal. More specifically, the CIR in the present specification is a correlation calculation result which is a result in which correlation between a wireless signal transmitted by a transmission side (hereinafter also referred to as a transmitted signal) and a wireless signal received by a reception side (hereinafter also referred to as a received signal) is obtained for each delay time which is a time since the transmitted signal was transmitted.

The reception side calculates a CIR by taking sliding correlation between a transmitted signal and a received signal. More specifically, the reception side calculates a value at which correlation between a received signal and a transmitted signal delayed by a delay time is taken as a property at the delay time (hereinafter also referred to as a CIR value). The reception side calculates a CIR by calculating a CIR value for each delay time. That is, the CIR is a time-series transition of CIR values. Here, the CIR value is a complex number that has I and Q components. A sum of squares of I and Q components of the CIR values is called a power value of the CIR in some cases. In a ranging technology using UWB, a CIR value is also called a delay profile. In the ranging technology using UWB, a sum of squares of I and Q components of CIR values is also called a power delay profile.

Hereinafter, a CIR calculation process in which a transmission side is the portable device 20 and a reception side is the in-vehicle device 10 will be described in detail with reference to FIGS. 3 and 4.

Figure 3:
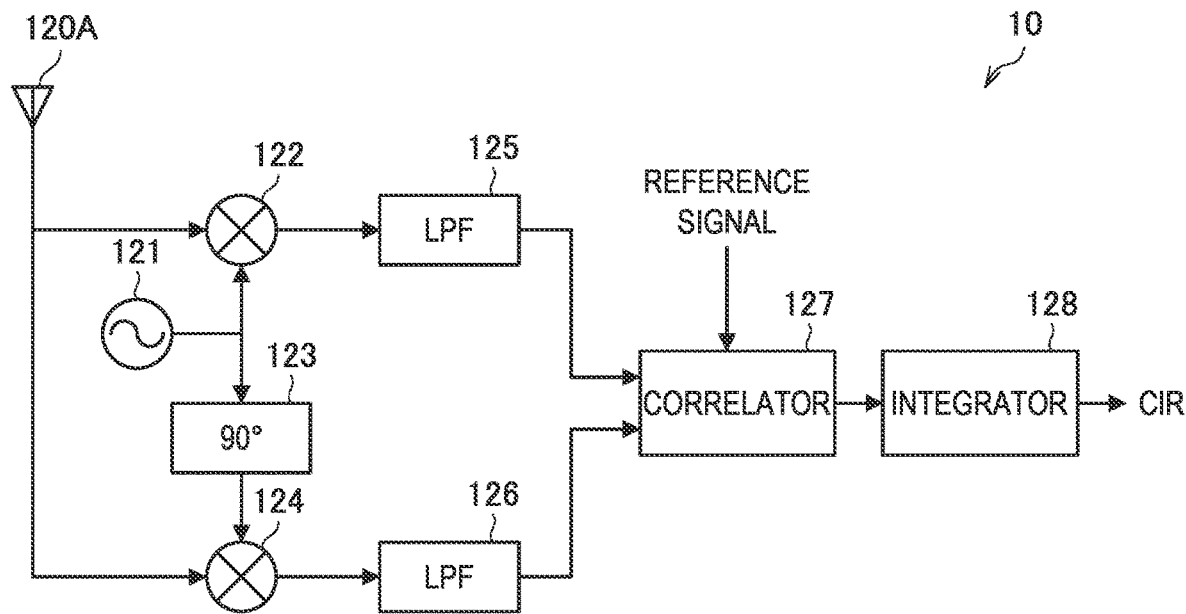
FIG. 3 is a diagram illustrating an example of a communication processing block of a communication unit 120 according to the embodiment.

FIG. 3 is a diagram illustrating an example of a communication processing block of the communication unit 120 according to the embodiment. As illustrated in FIG. 3, the communication unit 120 includes an oscillator 121, a multiplier 122, a 90° phase shifter 213, a multiplier 214, a lowpass filter (LPF) 125, an LPF 126, a correlator 127, and an integrator 128.

The oscillator 121 generates a signal with the same frequency as a frequency of a carrier wave carrying a transmitted signal and outputs the generated signal to the multiplier 122 and the 90° phase shifter 123.

The multiplier 122 multiplies a received signal received by the antenna 120A by the signal output from the oscillator 121 and outputs a multiplication result to the LPF 125. The LPF 125 outputs a signal with a frequency equal to or less than the frequency of the carrier wave carrying the transmitted signal among input signals to the correlator 127. The signal input to the correlator 127 is an I component (that is, a real part) of the components corresponding to an envelope curve of the received signal.

The 90° phase shifter 123 delays the phase of the input signal by 90° and outputs the delayed signal to the multiplier 124. The multiplier 124 multiplies the received signal received by the antenna 120A by the signal output from the 90° phase shifter 123 and outputs a multiplication result to the LPF 126. The LPF 126 outputs the signal with the frequency equal to or less than the frequency of the carrier wave carrying the transmitted signal among input signals to the correlator 127. The signal input to the correlator 127 is a Q component (that is, an imaginary part) of the components corresponding to the envelope curve of the received signal.

The correlator 127 calculates the CIR by taking sliding correlation between a reference signal and the received signal formed by the I and Q components output from the LPF 125 and the LPF 126. Here, the reference signal is the same signal as a transmitted signal before the carrier wave is multiplied.

The integrator 128 integrates the CIR output from the correlator 127 and outputs the integrated CIR.

The communication unit 120 performs the foregoing process on each of the received signals received from the plurality of antennas.

Figure 4:
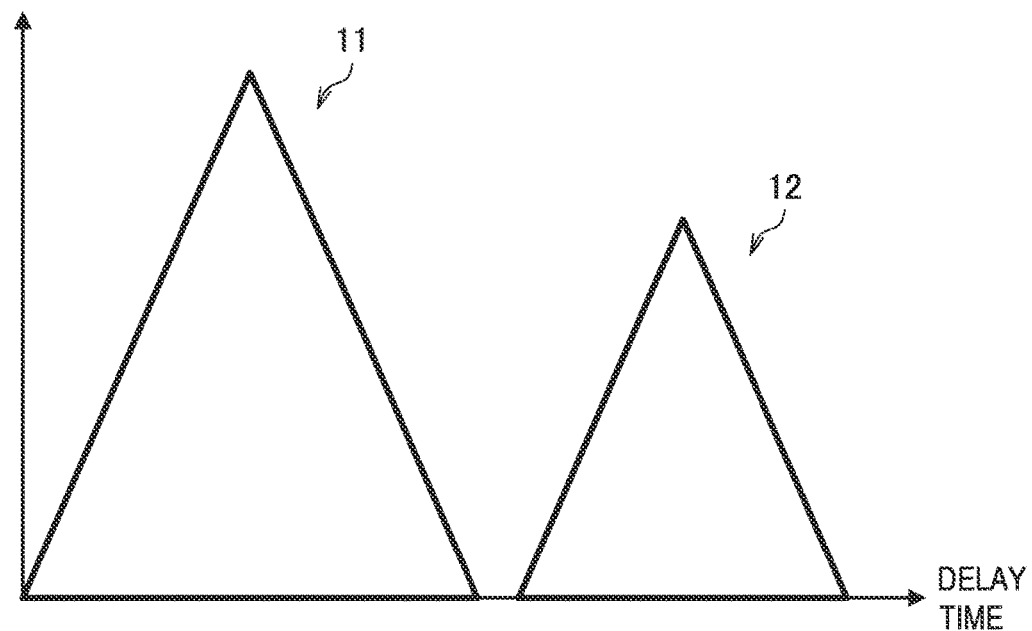
FIG. 4 is a graph illustrating an example of CIR output from an integrator 128 according to the embodiment.

FIG. 4 is a graph illustrating an example of CIR output from the integrator 128 according to the embodiment. In the graph, the horizontal axis represents a delay time and the vertical axis represents a delay profile. As in a CIR value at a certain delay time in the CIR, one piece of information included in information that varies chronologically is also called a sampling point. In the CIR, a set of sampling points between zero cross points generally corresponds to one pulse. The zero cross point is a sampling point of which a value is zero. Here, there is an exception in an environment where there is noise. For example, it may be ascertained that a set of sampling points between intersections of a level serving as a reference except for zero and transition of the CIR value corresponds to one pulse. The CIR illustrated in FIG. 4 includes a set 11 of sampling points corresponding to a certain pulse and a set 12 of sampling points corresponding to another pulse.

The set 11 corresponds to, for example, a pulse of a fast path. The fast path is a shortest path between transmission and reception and is a straight line distance between transmission and reception in an environment where there is no obstacle object. The pulse of the fast path is a pulse arriving at a reception side through the fast path. The set 12 corresponds to, for example, a pulse that has arrived at the reception side through a path other than the fast path.

A pulse detected as the pulse of the fast path is also called a first incoming wave. The first incoming wave is one of a direct wave, a delay wave, or a combined wave. The direct wave is a signal received directly (that is, without being reflected) on a reception side through a shortest path between transmission and reception. That is, the direct wave is a pulse of a fast path. The delay wave is a signal transmitted and received through a path which is not a shortest path, that is, reflected and received indirectly on the reception side. The delay wave is delayed more than the direct wave and is received by the reception side. The combined wave is a signal received by the reception side in a state in which a plurality of signals passing through a plurality of different paths are combined. In the following description, the first incoming wave is expressed simply as a signal in some cases.

Next, an example of a flow of a process related to estimation of the positional relation between the in-vehicle device 10 and the portable device 20 according to the embodiment will be described.

2.3 Estimating Positional Relation (1) Estimating Distance

The calculation unit 130 performs a measurement process. The measurement process is a process of estimating a distance between the in-vehicle device 10 and the portable device 20. The measurement process includes a process of transmitting and receiving a measurement signal and estimating a distance between the in-vehicle device 10 and the portable device 20, that is, a measured value, based on a time taken to transmit and receive a measurement signal.

In the measurement process, a plurality of measurement signals can be transmitted and received between the in-vehicle device 10 and the portable device 20. A measurement signal transmitted from one device to the other device among the plurality of measurement signals is expressed as a Poll signal. A measurement signal transmitted as a reply to a Poll signal from a device receiving the Poll signal to a device transmitting the Poll signal is expressed as Resp signal. A measurement signal transmitted as a reply to a Resp signal from a device receiving the Resp signal to a device transmitting the Resp signal is expressed as a Final signal. The in-vehicle device 10 and the portable device 20 can transmit and receive any measurement signal. In the present specification, however, an example in which the portable device 20 transmits the Poll signal will be described.

(2) Estimating Arrival Angle

The calculation unit 130 estimates an arrival angle of a signal transmitted and received between the devices. In the present specification, the Final signal included in the measurement signal will be described as a signal for estimating an arrival angle.

Hereinafter, an example of a process related to estimation of a distance and estimation of an arrival angle will be described with reference to FIG. 5.

Figures 5, 6:
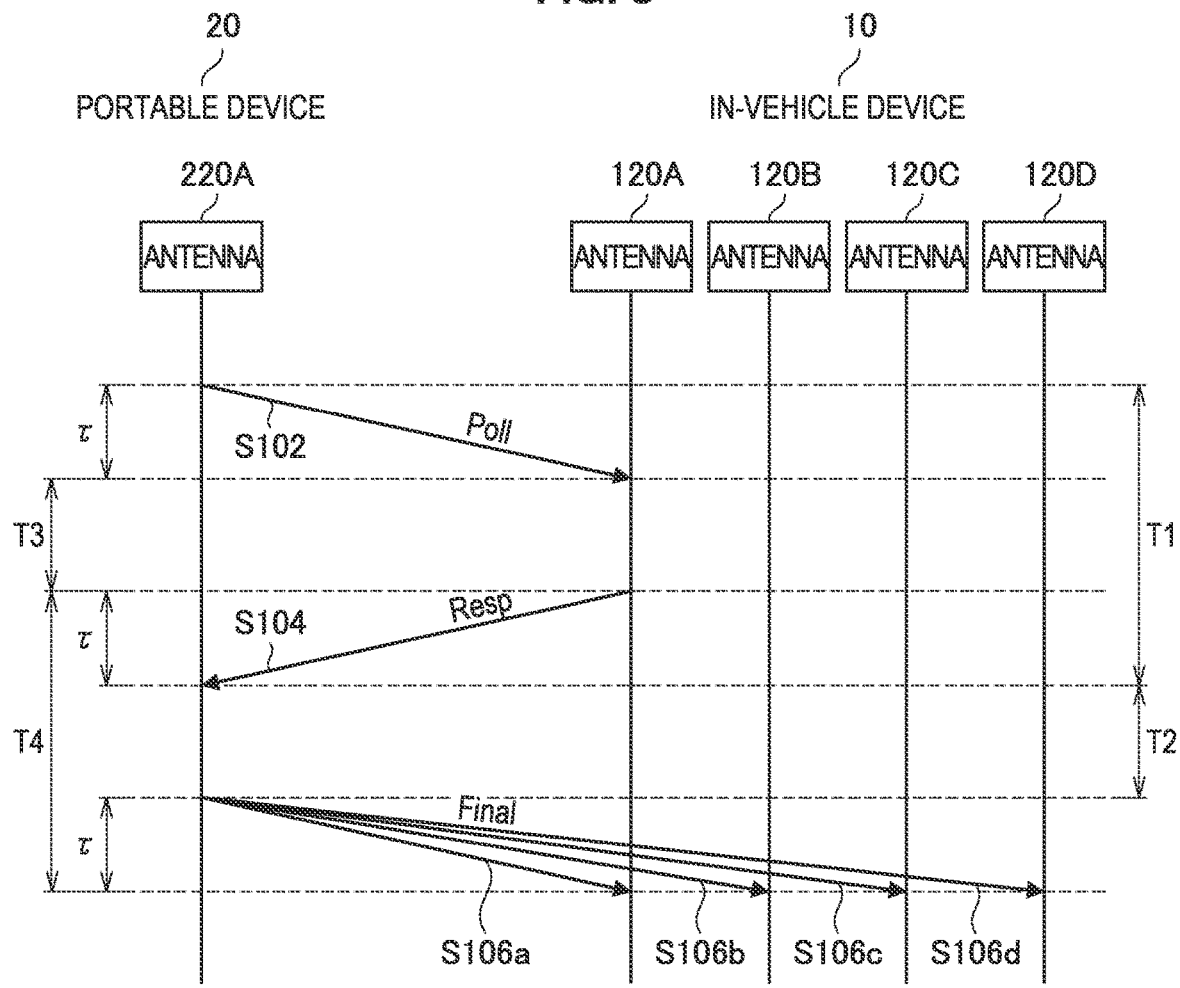
FIG. 5 is a sequence diagram illustrating an example of a process related to inter-device positional relation estimation performed in the system 1 according to the embodiment.
FIG. 6 is a diagram illustrating a specific example of a method of determining a presence area estimated most often by a control unit 330.

FIG. 5 is a sequence diagram illustrating an example of a process related to inter-device positional relation estimation performed in the system 1 according to the embodiment.

First, the antenna 220A included in the portable device 20 transmits a Poll signal to the antenna 120A included in the in-vehicle device 10 (S102).

Subsequently, the antenna 120A included in the in-vehicle device 10 transmits a Resp signal as a reply to the Poll signal to the antenna 220A included in the portable device 20 (S104).

Then, the antenna 220A included in the portable device 20 transmits a Final signal as a reply to the Resp signal to the antennas 120A, 120B, 120C, and 120D included in the in-vehicle device 10 (S106).

Here, for the portable device 20, a time length from transmission of the Poll signal to reception of the Resp signal is a time length T1 and a time length from reception of the Resp signal to transmission of the Final signal is a time length T2. Then, for the in-vehicle device 10, a time length from reception of the Poll signal to transmission of the Resp signal is a time length T3 and a time length from transmission of the Resp signal to reception of the Final signal is a time length T4.

A distance between the in-vehicle device 10 and the portable device 20 may be calculated using each of the above-described time lengths. For example, the in-vehicle device 10 may receive a signal including information regarding the time lengths T1 and T2 from the portable device 20. Then, the calculation unit 130 calculates a propagation time τ of the signal using the time lengths T1, T2, T3, and T4. More specifically, the calculation unit 130 may calculate the propagation time τ of the signal using the following Expression 1.

$$\tau = (T1 \times T4 - T2 \times T3)/(T1 + T2 + T3 + T4) \quad \text{(Expression 1)}$$

The calculation unit 130 may multiply the calculated propagation time τ of the signal by a known speed of a signal and estimates a distance between the in-vehicle device 10 and the portable device 20.

The example in which the calculation unit 130 estimates the distance between the in-vehicle device 10 and the portable device 20 based on the signals transmitted and received between the antenna 120A included in the in-vehicle device 10 and the antenna 220A included in the portable device 20 has been described. However, the signals may be transmitted and received using the antennas different from the antenna 120A included in the in-vehicle device 10 and another antenna or the signals may be transmitted and received using a plurality of antennas.

The propagation time τ of the signal is not limited to the calculation method using Expression 1. For example, the propagation time of the signal may be calculated by subtracting the time length T3 from the time length T1 and dividing that time by 2.

Subsequently, the arrival angle of the signal may be calculated from a phase difference of the Final signal received by the adjacent antennas among the plurality of antennas included in the in-vehicle device 10. For example, it is assumed that a phase of the Final signal received by the antenna 120A is a phase $P_A$, a phase of the Final signal received by the antenna 120B is a phase $P_B$, a phase of the Final signal received by the antenna 120C is a phase $P_C$, and a phase of the Final signal received by the antenna 120D is a phase $P_D$.

For example, a coordinate system in which a straight line connecting the antenna 120A to the antenna 120B is the x axis, a straight line connecting the antenna 120A orthogonal to the x axis to the antenna 120C is the y axis, and a perpendicular direction of the antenna 120A is the z axis is defined.

In the case of this coordinate system, phase differences $Pd_{AB}$ and $Pd_{CD}$ between the antennas adjacent in the X axis direction and phase differences $Pd_{AC}$ and $Pd_{BD}$ between the antennas adjacent in the Y axis direction are expressed using the following Expression 2.

$$Pd_{AB}=(P_B-P_A)$$

$$Pd_{CD}=(P_D-P_C)$$

$$Pd_{AC}=(P_C-P_A)$$

$$Pd_{BD}=(P_D-P_B) \quad \text{(Expression 2)}$$

Here, an angle formed between a straight line connecting the antennas 120A and 120B (or the antennas 120C and 120D) and a first incoming wave is referred to as a formed angle θ. An angle formed between a straight line connecting the antennas 120A and 120C (or the antennas 120B and 120D) and the first incoming wave is referred to as a formed angle Φ. Here, the formed angle θ and the formed angle Φ are expressed in Expression 3. λ is a wavelength of a radio wave and d is a distance between the antennas.

$$\theta \text{ or } \Phi = \arccos(\lambda \times Pd/(2\pi d)) \quad \text{(Expression 3)}$$

Accordingly, the calculation unit 130 calculates an arrival angle of a signal with Expression 4 based on Expressions 2 and 3.

$$\theta_{AB}=\arccos(\lambda \times (P_B-P_A)/(2\pi d))$$

$$\theta_{CD}=\arccos(\lambda \times (P_D-P_C)/(2\pi d))$$

$$\phi_{AC}=\arccos(\lambda \times (P_C-P_A)/(2\pi d))$$

$$\phi_{BD}=\arccos(\lambda \times (P_D-P_B)/(2\pi d)) \quad \text{(Expression 4)}$$

The calculation unit 130 may calculate an average value of $\theta_{AB}$ and $\theta_{CD}$ as the formed angle θ and may estimate one of $\theta_{AB}$ and $\theta_{CD}$ as the formed angle θ. Similarly, the calculation unit 130 may calculate an average value of $\phi_{AC}$ and $\phi_{BD}$ as the formed angle ϕ and may estimate one of $\phi_{AC}$ and $\phi_{BD}$ as the formed angle ϕ.

The calculation unit 130 may estimate a 3-dimensional position of the portable device 20 using the estimated distance and the formed angle θ or the formed angle ϕ.

For example, on the above-described coordinate system, the calculation unit 130 may estimate the 3-dimensional position of the portable device 20 using Expression 5.

$$x=R \times \cos\theta$$

$$y=R \times \cos\phi$$

$$z=\sqrt{(R^2-x^2-y^2)} \quad \text{(Expression 5)}$$

As described above, the calculation unit 130 can estimate a positional relation between the in-vehicle device 10 and the portable device 20 based on the signals transmitted and received between the plurality of antennas included in the in-vehicle device 10 and the antenna included in the portable device 20. On the other hand, depending on a multi path environment occurring between the plurality of antennas included in the in-vehicle device 10 and the antenna 220A included in the portable device 20, there is a possibility of estimation accuracy of the positional relation deteriorating.

Accordingly, based on signals received by any of the antennas included in the in-vehicle device 10 and the antenna 220A included in the portable device 20, the calculation unit 130 calculates a reliability parameter indicating how appropriate the signals transmitted and received between the plurality of antennas included in the in-vehicle device 10 and the antenna 220A included in the portable device 20 are as processing targets for estimating a presence area. The calculation unit 130 can estimate a positional relation between the in-vehicle device 10 and the portable device 20 with higher accuracy by using a signal in which the reliability parameter satisfies a predetermined reference to estimate the positional relation.

A certain device may transmit and receive the Poll signal, the Resp signal, and the Final signal. For example, any of the antennas included in the in-vehicle device 10 and the antenna 220A included in the portable device 20 transmits the Poll signal and the antenna 220A included in the portable device 20 transmits the Resp signal.

Next, a specific example of the reliability parameter calculated by the calculation unit 130 will be described.

2.4. Reliability Parameters

The calculation unit 130 according to the embodiment calculates the reliability parameter based on a received signal.

The reliability parameter is an index indicating how appropriate a signal received by any of the antennas included in the communication unit 120 or the communication unit 220 is as a processing target for estimating the presence area. For example, the reliability parameter is a continuous value or a discrete value, and indicates that the signal transmitted and received by the antenna is appropriate as the processing target for estimating the positional relation as the value is higher and indicates that the signal is not appropriate as the processing target for estimating the positional relation as the value is lower. Hereinafter, a specific example of the reliability parameter will be described.

Index Indicating Magnitude of Noise

The reliability parameter may be, for example, an index indicating magnitude of noise. More specifically, the calculation unit 130 may calculate the reliability parameter based on at least one of a power value of a signal received by the communication unit 120 and a signal noise ratio (SNR). When the power value or the SNR is high, an influence of noise is small. Therefore, a first reliability parameter indicating that a first incoming wave is appropriate as a detection target is calculated. Conversely, when the power value or the SNR is low, the influence of noise is considerable. Therefore, a reliability parameter indicating that the first incoming wave is not appropriate as a detection target may be calculated.

Index Indicating Validity of First Incoming Wave Which is Direct Wave

The reliability parameter is an index indicating validity of the first incoming wave which is the direct wave. The higher the validity of the first incoming wave which is the direct wave is, the higher the reliability is. The lower the validity of the first incoming wave which is the direct wave is, the lower the reliability is.

For example, the reliability parameter may be calculated based on consistency between signals of the plurality of antennas included in the communication unit 120. More specifically, the calculation unit 130 may calculate the reliability parameter based on at least one of a reception time and a power value of a signal of each of the plurality of antennas included in the communication unit 120. Due to an influence of multi paths, a plurality of signals arriving via different paths may be combined and received by the antennas in a state in which the signals are amplified or offset. When amplification and offsetting of the signals are different in the plurality of antennas, reception times and power values of the signals differ between the plurality of antennas. When a distance between the antennas which is a close distance of ½ of a wavelength of an arrival angle estimation signal is taken into consideration, a large difference in the reception time and the power value of the signal between the antennas 120A, 120B, 120C, and 120D indicates that validity of the signal which is a direct wave is low.

Index Indicating Validity of First Incoming Wave Which is not Combined Wave

The reliability parameter may be an index indicating validity of the first incoming wave which is not a combined wave. The higher the validity of the first incoming wave which is not a combined wave is, the higher the reliability is. The lower the validity of the first incoming wave which is not a combined wave is, the lower the reliability is. Specifically, the reliability parameter may be calculated based on at least one of the width of the first incoming wave in a time direction and a phase state of the first incoming wave.

Index Indicating Validity of Reception of Situation of Wireless Signal.

The reliability parameter may be an index indicating validity of a reception situation of a wireless signal. The higher the validity of the reception situation of the wireless signal is, the higher the reliability is. The lower the validity of the reception situation of the wireless signal is, the lower the reliability is.

For example, the reliability parameter may be calculated based on a variation in the plurality of first incoming waves. In this case, the reliability parameter may be calculated based on statistical amounts indicating a variation in the plurality of first incoming waves, such as a dispersion of power values of the first incoming waves and a dispersion and change amounts of estimated position parameters (the distance, the formed angles θ and Φ, and coordinates (x, y, z)).

Difference Between Delay Time of First Component and Delay Time of Second Component The reliability parameter may be a difference between a delay time of a first component in which a CIR value takes a peak first later than a specific component in the CIR and a delay time of a second component in which a CIR value takes a peak second later than the specific component. As illustrated in FIG. 4, a CIR waveform of the first incoming wave is a waveform that has one peak. On the other hand, when a combined wave is detected as the first incoming wave, the CIR waveform of the first incoming wave can be a waveform that has a plurality of peaks. Whether the CIR waveform of the first incoming wave has one peak or a plurality of peaks can be determined in accordance with a difference between the delay time of the first component and the delay time of the second component.

When the combined wave is detected as the first incoming wave, the estimation accuracy of the positional parameters deteriorates further than when the direct wave is detected as the first incoming wave. Accordingly, it can be said that the larger the difference between the delay time of the first component and the delay time of the second component is, the higher the reliability is.

Correlation of CIR Waveform

The reliability parameter may be derived based on the correlation of the CIR waveform in a certain pair of antennas among the plurality of antennas included in the communication unit 120. When a combined wave of the direct wave and the delay wave is received by the plurality of antennas included in the communication unit 120, a phase relation between the direct wave and the delay wave can differ between the antennas despite a distance which is short between the antennas. As a result, each CIR waveform in each antenna can be different. That is, the difference in the CIR waveform in a certain pair of antennas means reception of a combined wave in a least one antenna in the pair of antennas. When the combined wave is detected as the first incoming wave, that is, a specific component corresponding to the direct wave is not detected, the estimation accuracy of the position parameter deteriorates.

For example, the reliability parameter may be a correlation coefficient between the CIR obtained based on a received signal received from a certain antenna and the CIR obtained based on a received signal received by another antenna among the plurality of antennas included in the communication unit 120. In this case, for the reliability parameter, it is determined that the lower the correlation coefficient is, the lower the reliability is, and it is determined that the higher the correlation coefficient is, the higher the reliability is. The correlation coefficient includes, for example, a Pearson correlation coefficient.

Supplement

Hereinafter, supplement related to a specific example of the reliability parameter to be subsequently described will be described.

First, each of a plurality of sampling points included in the CIR is called a component below. That is, the CIR is assumed to include a CIR value of each delay time as a component. A form of the CIR, more specifically, a form of a chronological change in the CIR value, is called a CIR waveform.

Of a plurality of components included in the CIR, a component of specificity is also called a specific component below. The specific component is a component corresponding to the first incoming wave. The specific component is related to the first incoming wave and is detected in accordance with the above-described predetermined detection reference. For example, the specific component is a component in which an amplitude or power serving as a CIR value first exceeds a predetermined threshold among the plurality of components included in the CIR. Hereinafter, the predetermined threshold is also called a fast path threshold.

A time corresponding to a delay time of a specific component is used as a reception time of the first incoming wave to measure a distance. A phase of the specific component is used as a phase of the first incoming wave to estimate an arrival angle of a signal.

For the plurality of antennas included in the communication unit 120, the communication unit 120 in a line of sight (LOS) state and the communication unit 120 in a non-line of sight (NLOS) state are mixed.

The LOS state indicates a prospect between the antenna included in the in-vehicle device 10 and the antenna included in the portable device 20. In the LOS state, reception power of the direct wave is the highest. Therefore, there is a possibility of a reception side successfully detecting the direct wave as the first incoming wave.

The NLOS state indicates no prospect between the antenna included in the in-vehicle device 10 and the antenna included in the portable device 20. In the NLOS state, there is a possibility of reception power of the direct wave being lower than the other. Therefore, there is a possibility of a reception side failing to detect the direct wave as the first incoming wave.

When the communication unit 120 is in the NLOS state, reception power of the direct wave in the signal arriving from the portable device 20 is less than that that of noise. Accordingly, although the direct wave is successfully detected as the first incoming wave, a phase and a reception time of the first incoming wave may be changed due to an influence of the noise. In this case, measurement accuracy and estimation accuracy of an arrival angle may deteriorate.

Further, when the communication unit 120 is in the NLOS state, reception power of the direct wave is lower than when the communication unit 120 is in the LOS state. Thus, detection of the direct wave as the first incoming wave may fail. In this case, the measurement accuracy and the estimation accuracy of an arrival angle may deteriorate.

Difference between Delay Time of Specific Component and Delay Time of Component with Maximum CIR Value Accordingly, the reliability parameter may be a difference between a delay time of a specific component and a delay time of a component with a maximum CIR value in the CIR.

When the communication unit 120 is in the LOS state, the CIR value of the direct wave is the largest. Therefore, the component a maximum CIR value in the CIR is included in a set corresponding to the direct wave.

On the other hand, when the communication unit 120 is in the NLOS state, the CIR value of the delay wave can be greater than the CIR value of the direct wave. When the communication unit 120 is in the NLOS state, an obstacle object is on the way of the fast path. In particular, when a human body is on the way of the fast path and the direct wave passes through the human body, the direct wave considerably attenuates. In this case, a component with the maximum CIR value in the CIR is not included in the set corresponding to the direct wave.

Whether the communication unit 120 is in the LOS state or the NLOS state can be determined in accordance with a difference between the delay time of the specific component and the delay time of the component with the maximum CIR value in the CIR.

This is because when the communication unit 120 is in the LOS state, the difference can decrease. Further, this is because when the communication unit 120 is in the NLOS state, the difference can increase.

The specific example of the reliability parameter according to the embodiment has been described above. Next, a method of determining a presence area estimated most often by the control unit 330 according to the embodiment will be described with reference to FIG. 6.

2.5. Determination Example of Presence Area

FIG. 6 is a diagram illustrating a specific example of a method of determining a presence area estimated most often by the control unit 330.

First, the calculation unit 130 estimates the reliability parameter, a 3-dimensional position of the portable device 20, and a presence area of the portable device 20 from signals transmitted and received a plurality of times between the in-vehicle device 10 and the portable device 20 for a certain time length. In FIG. 6, the certain time length is a time t1 to a time t6, the time t1 indicates an earliest time, and the time t6 indicates the latest time. In FIG. 6, determination results of six rounds are estimated in No1 to N6 during the certain time length. However, the number of pieces of data used for determination is not limited to this example. Control may be performed based on more determination results. The control may be performed based on fewer determination results.

In FIG. 6, an example in which the reliability parameter is reception power of a signal will be described, but the embodiment is not limited to this example. For example, the reliability parameter may be any reliability parameter described in the specific example of the above-described reliability parameters or a plurality of reliability parameters may be combined among the above-described reliability parameters.

A 3-dimensinonal position of the portable device 20 is given as an example of an estimated position. For example, an estimated position may be a 2-dimensional coordinate position of the portable device 20.

In FIG. 6, determination results indicate examples in which any of a driver (D) entry indicating that the portable device 20 is near a driver seat, a passenger (P) entry indicating that the portable device 20 is near a passenger seat, and black door (BD) entry indicating that the portable device 20 is near a back door is determined. Of course, the embodiment is not limited to the determination results of the P entry, the D entry, and the BD entry. For example, the determination results may include a vehicle interior entry indicating that the portable device 20 is inside a vehicle or a vehicle exterior entry indicating that the portable device 20 is outside of the vehicle. Further, the determination result may include a vehicle exterior non-operation area indicating that the portable device 20 is in an area which is outside of the vehicle and where entry is not allowed. The entry in the present specification includes a meaning as a state in which the control unit 330 can perform control related to a predetermined operation on a controlled device.

More specifically, when a determination result is a vehicle interior entry, the control unit 330 may perform control related to starting or stopping on an engine included in the moving object V1. When a determination result is a vehicle exterior entry, the control unit 330 may perform control related to unlocking or locking of a door key of the vehicle. When a determination result is a D entry, a P entry, or a BD entry, the control unit 330 may perform control related to unlocking or locking of at least one of the doors including a door associated with each entry.

On the other hand, when a determination result is a vehicle exterior non-operation, control related to the above-described predetermined operation is not performed on a controlled device. For example, when the determination result is the vehicle exterior non-operation, the control unit 330 may perform control such that signals are transmitted and received between the in-vehicle device 10 and the portable device 20 again or may end a process of the system 1 according to the embodiment.

In FIG. 6, a position change indicates a movement of the portable device 20 detected by the sensor unit 230 included in the portable device 20. In FIG. 6, "small" or "large" is expressed as the degree of a change in the position of the portable device 20. For example, when the sensor unit 230 is an acceleration sensor and an absolute value of acceleration detected as a continuous value is equal to or greater than a threshold, "large" may be set. When the absolute value is less than the threshold, "small" may be set. Hereinafter, specific examples of determination methods will be described.

Determination Method Example 1

The control unit 330 may perform control based on a presence area estimated most often among a plurality of presence areas estimated from signals transmitted and received at certain times t1 to t6.

For example, in FIG. 6, the D entry is estimated 3 times, the P entry is estimated 2 times, and the BD entry is estimated once at the certain times t1 to t6. Accordingly, the control unit 330 may perform control based on the D entry estimated most often. Thus, the control unit 330 can reduce an influence of a calculation error of a 3-dimensional position calculated by the calculation unit 130 and perform control based on the presence area of the portable device 20 with higher accuracy.

Determination Method Example 2

The control unit 330 may perform based on a presence area most often among presence areas estimated using signals in which the reliability parameter satisfies a predetermined reference.

For example, in FIG. 6, when the reliability parameter is "reception power and the predetermined reference is "−80 dBm or more," the presence areas estimated using the signals in which the reliability parameter satisfies the predetermined reference include determination results of No1, No2, No5, and No6. That is, for the presence areas estimated using the signals in which the reliability parameter satisfies the predetermined reference, the D entry is estimated once, the P entry is estimated 2 times, and the BD entry is estimated once. Accordingly, the control unit 330 may perform control based on the P entry estimated most often. Thus, the control unit 330 can reduce an influence of a calculation error caused due to multi paths and perform control based on the presence area of the portable device 20 with higher accuracy.

Determination Method Example 3

The control unit 330 may perform control based on a presence area estimated most often among a predetermined number of presence areas estimated using signals in which the reliability parameters satisfy the predetermined reference.

For example, a case in which the reliability parameter is "reception power," the predetermined reference is "−80 dBm or more," and the predetermined number is "3" in FIG. 6 will be described. As described in Determination Method Example 2, in FIG. 6, the presence areas estimated using the signals in which the reception power satisfies the predetermined reference include determination results of No1, No2, No5, and No6. When the predetermined number is "3," the control unit 330 may perform control based on the presence area estimated most often in the determination results of No.2, No5, and No6 at subsequent times among the plurality of determination results. When the predetermined number of presence areas estimated using the signals in which the reliability parameter satisfies the predetermined reference cannot be obtained, the control unit 330 may perform control such that the signals for estimating the presence area of the portable device 20 are transmitted and received between the in-vehicle device 10 and the portable device 20 again until the predetermined number or more of presence area estimated using the signals in which the reliability parameter satisfies the predetermined reference is acquired, or may not perform the control related to a predetermined operation of a controlled device. Thus, the number of pieces of data used to determine the presence area estimated most often is fixed, and thus the control unit 330 can perform control based on the presence area of the portable device 20 more simply.

Determination Method Example 4

The control unit 330 may perform control based on the presence area estimated most often among the presence areas estimated using signals with which a movement of the portable device 20 equal to or greater than a reference is detected.

For example, the presence areas estimated using the signals in which the position change is detected as "large" by the sensor unit 230 of the portable device 20 include determination results of No4, No5, and No6. The presence area used for determination may include a determination result after the first time even in the determination results in which the position change is small. In FIG. 6, the position change is small and a determination result of No3 corresponds to the determination result after the first time. When the presence area used for the determination includes the determination result of No3, the D entry is estimated 2 times, the P entry is estimated once, and the BD entry is estimated once for the presence area used for the determination. Accordingly, the control unit 330 may perform control based on the D entry estimated most often. Thus, the control unit 330 can determine the presence area of the portable device 20 more simply and perform control based on the determination result.

When a change in an estimated position (for example, a 3-dimensional position of the portable device 20) occurs by a predetermined value more while the position change detected by the sensor unit 230 is continuously "small" (in FIG. 6, No1 to No3), the control device 30 may perform control such that the control process is stopped or the signals are transmitted and received again between the in-vehicle device 10 and the portable device 20.

For example, the change in the 3-dimensional position of the portable device 20 by the predetermined value or more is likely to be inaccurate while the sensor unit 230 of the portable device 20 detects the position change as "small." Accordingly, When the control process is stopped and the signals are transmitted and received again between the in-vehicle device 10 and the portable device 20, the control device 30 can perform control based on a more accurate determination result.

Determination Method Example 5

The control unit 330 may determine the presence area most often by combining Determination Method Example 2 or 3 and Determination Method Example 4. Specifically, the control unit 330 may perform control based on the presence area estimated most often among the presence areas estimated using the signals in which the reliability parameter satisfies the predetermined reference and a movement of the portable device 20 equal to or greater than the reference is detected.

For example, similarly to the conditions used in the foregoing description, it is assumed that the reliability parameter is "reception power," the predetermined reference is "−80 dBm or more," and a movement equal to or greater than the reference is "large position change." In this case, the presence areas used for the determination include determination results of No5 and No6. That is, for the presence areas used for the determination, the D entry is estimated 0 times, the P entry is estimated once, and the BD entry is estimated once. In this way, when the plurality of entries are estimated the same number of times, the signals may be transmitted and received again between the in-vehicle device 10 and the portable device 20. The control unit 330 may perform control based on determination of the presence area after a later time. For example, in FIG. 6, the BD entry is a determination result at the time t5 and the P entry is a determination result at the time t6. Accordingly, the control unit 330 may perform control based on the P entry which is the determination result at the time t6 which is the later time. Thus, the control unit 330 can perform control based on the presence area of the portable device 20 more simply and with higher accuracy.

The specific examples of the method of determining the presence area estimated most often by the control unit 330 have been described above. Next, an operation process of the system 1 according to the embodiment will be described.

3. Exemplary Operation Process

Figure 7:
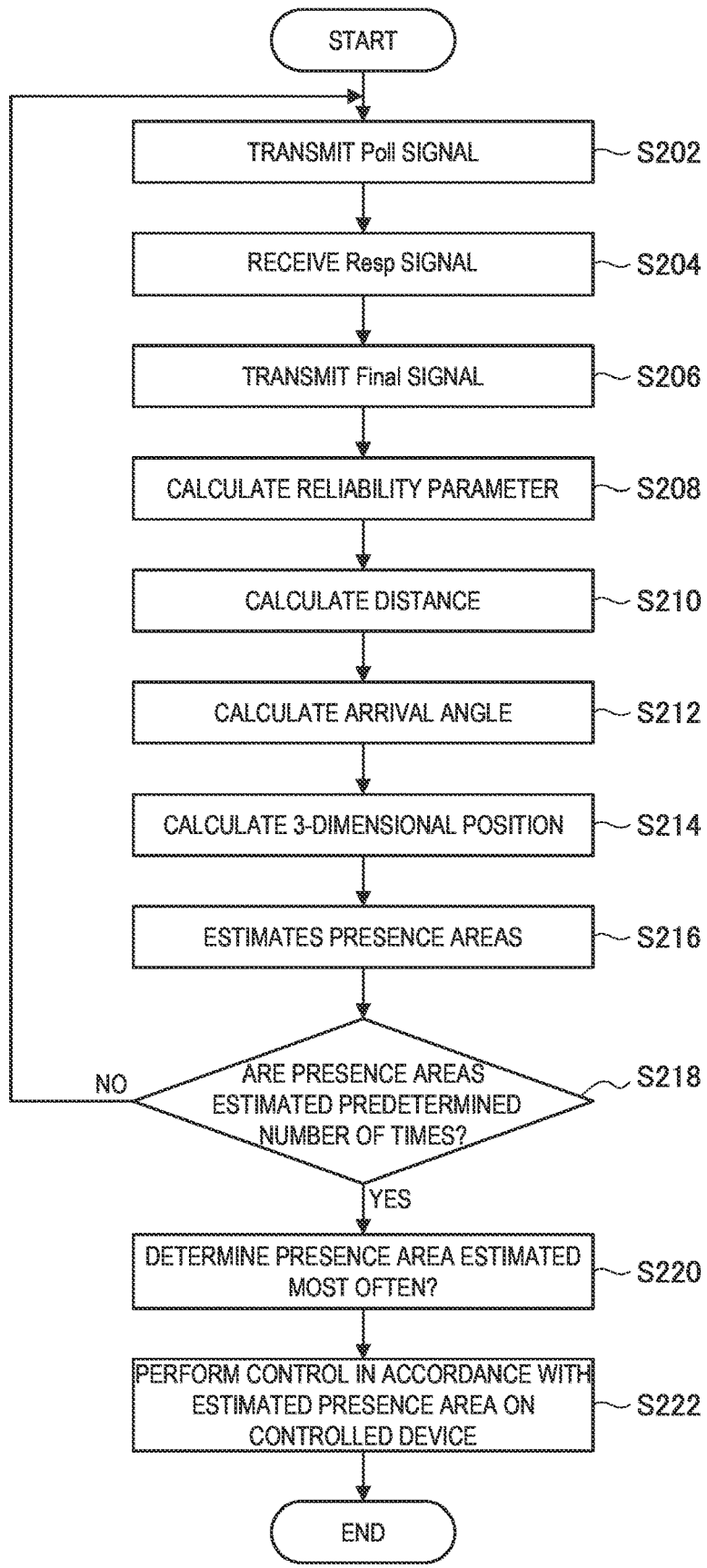
FIG. 7 is a diagram illustrating an example of an operation process related to the system 1 according to the embodiment.

FIG. 7 is a diagram illustrating an example of an operation process related to the system 1 according to the embodiment.

First, the antenna 220A included in the portable device 20 transmits the Poll signal to the antenna 120A included in the in-vehicle device 10 (S202).

Subsequently, the antenna 220A included in the portable device 20 receives the Resp signal transmitted from the antenna 120A included in the in-vehicle device 10 as a reply to the Poll signal (S204).

Subsequently, the antenna 220A included in the portable device 20 transmits the Final signal as a reply to the Resp signal to the plurality of antennas included in the in-vehicle device 10 (S206).

Then, the calculation unit 130 calculates the reliability parameter based on the received Final signal (S208). The calculation unit 130 may calculates the reliability parameter based on the received Poll signal or may calculate the reliability parameter from each of the Poll signal and the Final signal.

Then, the calculation unit 130 calculates a measured value which is a distance between the in-vehicle device 10 and the portable device 20 based on the signals transmitted and received between the antenna 120A included in the in-vehicle device 10 and the antenna 220A included in the portable device 20 (S210).

Subsequently, the calculation unit 130 calculates an arrival angle of the signal based on the signals transmitted and received between the plurality of antennas included in the in-vehicle device 10 and the antenna 220A included in the portable device 20 (S212).

Subsequently, the calculation unit 130 estimates a 3-dimensional position of the portable device 20 based on the measured value calculated in S210 and the arrival angle of the signal calculated in S212 (S214).

Then, the calculation unit 130 estimates the presence areas of the portable device 20 based on the 3-dimensional position of the portable device 20 estimated in S214 (S216).

Here, the communication unit 120 included in the in-vehicle device 10 transmits information regarding the estimated presence areas of the portable device 20 to the communication unit 310 included in the control device 30 and the communication unit 310 outputs the information regarding the presence areas of the portable device 20 to the storage unit 320.

Then, the in-vehicle device 10 determines whether the presence areas of the portable device 20 are estimated a plurality of times during a certain time length (S218). When the presence areas are estimated the plurality of times, the process proceeds to S220 (Yes in S218). When the presence areas are not estimated the plurality of times, the process returns to S202 (No in S218) and the signals are transmitted and received again between the in-vehicle device 10 and the portable device 20.

When the presence areas are estimated the plurality of times (Yes in S218), the control unit 330 included in the control device 30 determines the presence area estimated most often in an estimation result of the plurality of presence areas (S220).

Then, the control unit 330 performs control in accordance with the presence area determined to be estimated most often on the controlled device mounted in the moving object V1 (S222).

Through the control according to the embodiment, there is a possibility of a reduction in an influence of an estimation error caused due to multi paths or the like, and thus the control unit 330 can perform control based on the presence area of the portable device 20 with higher accuracy.

4. Supplement

The preferred embodiments of the present invention have been described in detail above with reference to the appended drawings, but present invention is not limited thereto. It should be understood by those skilled in the art that various changes and alterations may be made within the scope of the technical spirits described in the appended claims and the various changes and alternations, of course, pertain to the technical scope of the present invention.

For example, the series of processes performed by the devices described in the present specification may be implemented using any of software, hardware, and a combination of software and hardware. A program of the software is stored in advance, for example, a recording medium (non-transitory medium) provided inside or outside of each device. For example, each program is read to a RAM at the time of execution in a computer and is executed by a processor such as a CPU. Examples of the recording medium include a magnetic disk, an optical disc, a magneto-optical disc, and a flash memory. The computer program may be delivered via a network, for example, without using a recording medium.

The processes described with reference to the sequence diagrams may not necessarily be performed in the order described in the drawing. For example, some of the processing steps may be performed in parallel. Additional processing steps may be adopted and some of the processing steps may be omitted.

What is claimed is:

1. A control device comprising:
   a processor configured to perform control based on a presence area of a second communication device estimated using signals transmitted and received between a first communication device and the second communication device,
   wherein the processor performs control based on a presence area estimated most often among a plurality of presence areas estimated from signals transmitted and received a plurality of times during a certain time length, wherein the processor performs control based on a presence area estimated most often among presence areas estimated using signals in which a reliability parameter indicating how appropriate the signals transmitted and received between the first and second communication devices are as the signals used to estimate the presence areas satisfies a predetermined reference, and wherein the reliability parameter includes at least one of an index indicating magnitude of noise of a signal received by at least one of the first and second communication devices and an index indicating validity indicating that the signal is a direct wave.

2. The control device according to claim 1, wherein the processor performs control based on a presence area estimated most often among a predetermined number of presence areas estimated using the signals in which the reliability parameter satisfies the predetermined reference.

3. The control device according to claim 1, wherein the first communication device is mounted in a moving object.

4. The control device according to claim 3, wherein the second communication device is carried by a user using the moving object.

5. The control device according to claim 3, wherein the processor performs control based on a presence area estimated most often among presence areas estimated using signals in which a motion of the second communication device equal to or greater than a certain reference is detected when the signals are transmitted and received.

6. The control device according to claim 5, wherein the motion is acquired by an acceleration sensor.

7. The control device according to claim 3, wherein the processor performs control in accordance with a presence area estimated most often for a controlled device mounted on the moving object.

8. The control device according to claim 7, wherein the control in accordance with the presence area includes control related to an operation of the moving object.

9. The control device according to claim 7, wherein the control in accordance with the presence area includes unlocking or locking of a door of the moving object.

10. The control device according to claim 1, wherein the presence area of the second communication device is estimated using a distance between the first and second communication devices estimated based on the transmitted and received signals.

11. The control device according to claim 1, wherein the signals include a wireless signal in conformity with ultra-wideband wireless communication.

12. A computer-readable non-transitory storage medium that stores a program causing a computer to implement a control function of performing control based on a presence area of a first or second communication device estimated using signals transmitted and received between the first and second communication devices, wherein control is performed based on a presence area estimated most often among a plurality of presence areas estimated from signals transmitted and received a plurality of times during a certain time length, wherein the control is performed based on a presence area estimated most often among presence areas estimated using signals in which a reliability parameter indicating how appropriate the signals transmitted and received between the first and second communication devices are as the signals used to estimate the presence areas satisfies a predetermined reference, and wherein the reliability parameter includes at least one of an index indicating magnitude of noise of a signal received by at least one of the first and second communication devices and an index indicating validity indicating that the signal is a direct wave.

* * * * *